(12) United States Patent
Fawley et al.

(10) Patent No.: US 9,092,067 B2
(45) Date of Patent: Jul. 28, 2015

(54) PHASE DISCIPLINED, DIRECT DIGITAL SYNTHESIZER BASED, COHERENT SIGNAL GENERATOR

(71) Applicant: Teledyne Wireless, LLC, Thousand Oaks, CA (US)

(72) Inventors: Richard James Fawley, Shipley (GB); Husein Masoum, Loughborough (GB); Alex Scarbro, Baildon (GB); Anthony David Williams, Aptos, CA (US)

(73) Assignee: TELEDYNE WIRELESS, LLC, Thousand Oaks, CA (US)

( * ) Notice: Subject to any disclaimer, the term of this patent is extended or adjusted under 35 U.S.C. 154(b) by 0 days.

(21) Appl. No.: 13/776,591

(22) Filed: Feb. 25, 2013

(65) Prior Publication Data

US 2014/0240004 A1 Aug. 28, 2014

(51) Int. Cl.
*H03B 21/00* (2006.01)
*G06F 1/02* (2006.01)

(52) U.S. Cl.
CPC ..................................... *G06F 1/022* (2013.01)

(58) Field of Classification Search
CPC .......... H03B 21/02; H03B 21/00; H03L 7/16; H03L 7/18; H03L 7/23; G06F 1/0328; G06F 1/0321; G06F 1/0342; G06F 1/0353; G06F 7/68
USPC ................... 327/106, 105; 708/271
See application file for complete search history.

(56) References Cited

U.S. PATENT DOCUMENTS

| | | | |
|---|---|---|---|
| 5,673,212 A * | 9/1997 | Hansen | 708/271 |
| 8,369,476 B2 * | 2/2013 | Tseng et al. | 377/47 |
| 2008/0005213 A1 * | 1/2008 | Holtzman | 708/276 |
| 2008/0130785 A1 * | 6/2008 | Reinhardt | 375/296 |
| 2008/0284470 A1 * | 11/2008 | Park et al. | 327/105 |
| 2011/0199127 A1 * | 8/2011 | Turner | 327/105 |
| 2012/0139587 A1 * | 6/2012 | Drago et al. | 327/106 |

OTHER PUBLICATIONS

Holzworth Instrumentation Inc.; www.holzworth.com; HRB0220A Rocket Box Synthesizer Module; Produced by Holzworth Instrumentation Inc. Preview HRB0220A, pp. 1 and 2, Jun. 2012.
Miron Waisbein, "Multiplying Digital Synthesizer" published in Electronic Design, Apr. 3, 2000.; 2 pages.
Analog Devices 3.5 GSPS Direct Digital Synthesizer with 12-Bit DAC AD9914; www.analog.com; 47 pages. 2012 Copyright date.

* cited by examiner

*Primary Examiner* — Quan Tra
(74) *Attorney, Agent, or Firm* — K&L Gates LLP

(57) ABSTRACT

A phase coherent signal generator apparatus is disclosed that has fast frequency shifting and numerous phase memory points, outputting a coherent continuous phase signal that includes fast switched multiple different frequency bursts. The apparatus comprises: a clock generator including an input that receives a reference clock signal, an output that supplies a master clock signal, and an output that supplies a slave clock signal; an accumulating digital synthesizer that includes a first input that receives the slave clock signal, a second input that receives a digital frequency tune word signal, a third input that receives a phase tune word signal, a fourth input that receives a reset signal, and an output that supplies a digital coherent continuous phase signal; a master digital synthesizer that includes a first input that receives the master clock signal, a second input that receives the digital frequency tune word signal, a first output that supplies the digital phase tune word signal, and a second output that supplies a reset signal; and a converter that receives the digital coherent continuous phase signal and supplies the coherent continuous phase signal.

15 Claims, 10 Drawing Sheets

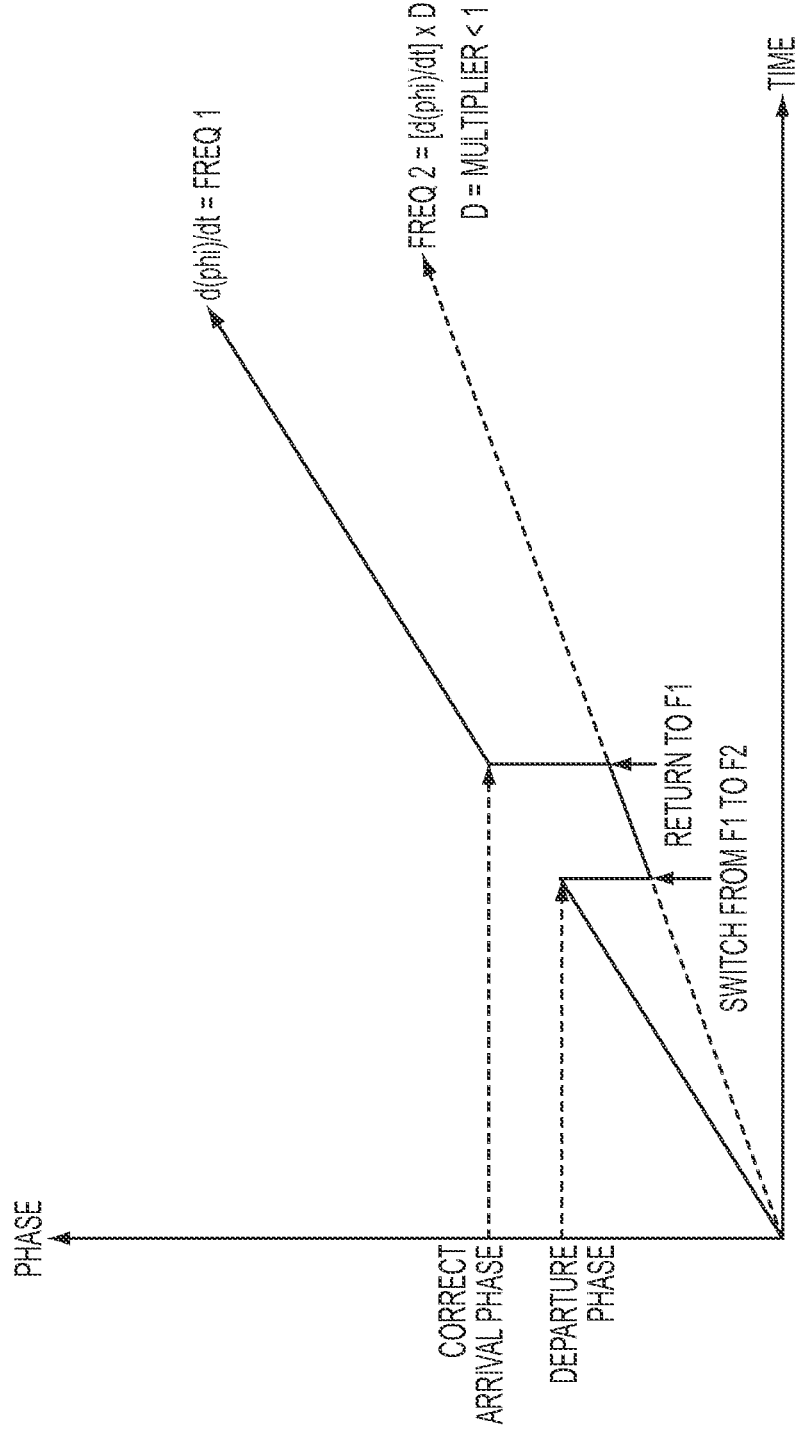

PHASE DISCIPLINED, DIRECT DIGITAL SYNTHESIZER BASED, COHERENT SIGNAL GENERATOR

BACKGROUND

1. Field

This disclosure relates to a method and an apparatus for generating a phase coherent radio frequency (RF) signal.

2. Related Art

Waveform generators frequently include coherent frequency synthesis (CFS) to generate a train of finite-length phase-modulated RF signal segments (bursts) that differ in frequency, but which remain coherent in phase from burst to burst. That is, the generated waveform has the characteristic that the relative phase of any one segment (or burst) of the waveform is uniquely and predictably related to the relative phase of any other segment of the composite waveform. Such waveform generators are frequently implemented in applications such as, for example, RF communication, Doppler radar systems, Electromagnetic Warfare (EW) systems, navigation systems, and the like.

At the time of this writing, Holzworth Instrumentation, Inc., of Boulder Colo., USA, offered an RF synthesizer module, product no. HRB0220A, that offered broadband switching capabilities with fast frequency switching. The product included active phase memory.

Conventional CFS waveform generators have required the use of complex frequency multiplication and division techniques, mixing and filtering processes, and the generation of binary sequences at fairly high clock rates. Accordingly, an unfulfilled need exists for a CFS waveform generator that is low cost, easy to control, capable of high switching speeds, and can generate a large number (e.g., a million, a billion, or the like) distinct frequencies.

SUMMARY OF THE DISCLOSURE

The present disclosure provides an apparatus that is low cost, easy to control, capable of high switching speeds, and can generate a phase coherent signal having a large number distinct frequencies (e.g., a million, a billion, or the like). The present disclosure also provides a method for generating a phase coherent RF signal.

In the present disclosure, a master multiplier based phase generator generates phase data which remains coherent following any number of frequency tune operations. Following a frequency tune operation, the slave accumulator based phase generator is initialized with the coherent phase data produced by the master multiplier based phase generator, its output phase data retaining the coherency maintained by the master multiplier based phase generator. The output of the slave accumulator based phase generator retains coherency when clocked at a rate greater than (or equal to) the master multiplier based phase generator.

In one aspect of the disclosure, a phase coherent signal generator apparatus is disclosed that has fast frequency shifting and numerous phase memory points, outputting a coherent continuous phase signal that includes fast switched multiple different frequency bursts. The apparatus comprises: a clock generator including an input that receives a reference clock signal, an output that supplies a master clock signal and/or a slave clock signal; an accumulating digital synthesizer that includes a first input that receives the slave clock signal, a second input that receives a digital frequency tune word signal, a third input that receives a phase tune word signal, a fourth input that receives a reset signal, and an output that supplies a digital coherent continuous phase signal; a master digital synthesizer that includes a first input that receives the master clock signal, a second input that receives the digital frequency tune word signal, a first output that supplies the digital phase tune word signal, and a second output that supplies a reset signal; and a converter that receives the digital coherent continuous phase signal and supplies the coherent continuous phase signal.

The accumulating digital synthesizer may comprise a slave phase accumulator; and/or a summer, which may include an input that receives the digital phase tune word signal. A phase of the digital coherent continuous phase signal output by the accumulating digital synthesizer may be set by the digital phase tune word signal.

The accumulating digital synthesizer may be activated and accumulate phase at a rate determined based on the slave clock signal and the digital frequency tune word signal.

The slave phase accumulator may comprise a summer and a clocked latch, a feedback line, and/or an input that receives the reset signal.

The clock generator may multiply the master clock signal by a multiplying factor of 8 to produce the slave clock signal.

According to another aspect of the disclosure, a phase coherent signal generator apparatus is disclosed that outputs a coherent continuous phase signal having bursts of different frequencies. The apparatus comprises: an accumulating digital synthesizer that includes a first input that receives a slave clock signal and a second input that receives a digital frequency tune word signal; and a master digital synthesizer that includes a first input that receives a master clock signal and a second input that receives the digital frequency tune word signal, wherein the master digital synthesizer accumulates phase at a rate determined by the master clock signal and the digital frequency tune word signal, and wherein the master digital synthesizer disciplines the accumulating digital synthesizer. The apparatus may further comprise: a clock generator that multiplies the master clock signal by a predetermined multiplication factor to produce the slave clock signal; or a clock generator that divides the slave clock signal by a predetermined division factor to produce the master clock signal. The clock generator may receive a reference clock signal from a clock source. The master clock signal may be substantially the same as the reference clock signal.

The master digital synthesizer may comprise: a binary counter having an input coupled to the clock generator; and a digital multiplier having an input coupled to the binary counter.

The digital multiplier may comprise another input that receives the digital frequency tune word signal.

The digital multiplier may comprise an output that supplies a digital phase tune word signal to the accumulating digital synthesizer.

The accumulating digital synthesizer may comprise a direct digital synthesizer with a 12-bit digital to analog converter.

In yet another aspect of the disclosure, a method is disclosed for generating a coherent continuous phase signal having bursts of different frequencies. The method comprises: receiving a clock signal; receiving a frequency tune word signal; generating a phase tune word signal; accumulating phase at a rate based on the clock signal and the frequency tune word signal; and outputting the coherent continuous phase signal based on the phase tune word signal. The phase tune word signal may be generated based on the clock signal and the frequency tune word signal.

The method may further comprise multiplying the clock signal by a predetermined multiplier to produce a slave clock signal. The accumulating phase rate may be based on the slave clock signal.

Additional features, advantages, and embodiments of the disclosure may be set forth or apparent from consideration of the following detailed description, drawings, and claims. Moreover, it is to be understood that both the foregoing summary of the disclosure and the following detailed description are examples and are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIG. 4A shows a time-phase graph that illustrates an output signal from a slave digital synthesizer (DS) in the PCS generator of FIG. 2;

Figure 1:
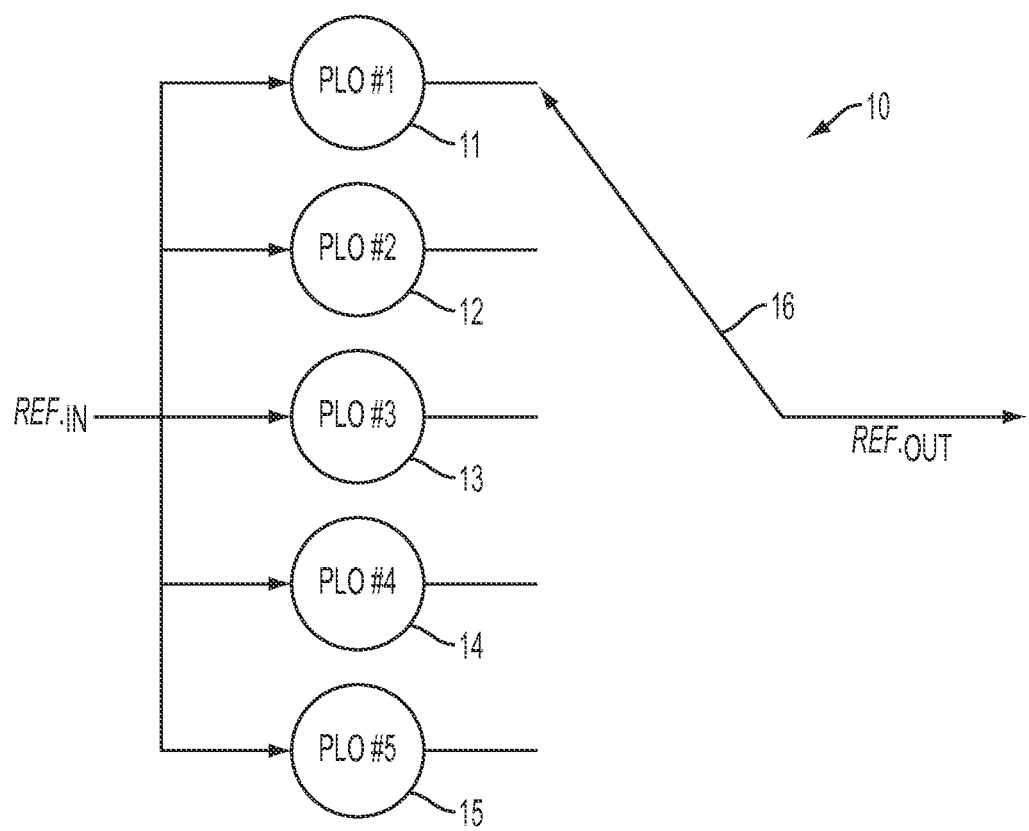
FIG. 1 shows an example of a waveform generator that is configured to output a signal having a plurality of finite-length phase-modulated RF signal segments.

The present disclosure is further described in the detailed description that follows.

DETAILED DESCRIPTION

The embodiments of the disclosure and the various features and details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments, even if not explicitly stated herein. Descriptions of well-known components and processing techniques may be omitted so as to not unnecessarily obscure teaching principles of the disclosed embodiments. The examples used herein are intended merely to facilitate an understanding of ways in which the disclosure may be practiced and to further enable those of skill in the art to practice disclosed the embodiments. Accordingly, the examples and embodiments herein should not be construed as limiting. Moreover, it is noted that like reference numerals represent similar parts throughout the several views of the drawings.

FIG. 1 shows an example of a waveform generator 10 that is configured to output a reference output signal $Ref_{out}$ that has a plurality of finite-length phase-modulated RF signal segments, which differ in frequency, but which remain coherent in phase from segment to segment. The waveform generator 10 includes a plurality (e.g., five) phase locked oscillators (PLOs) 11-15 and a switch 16. The input of each PLO 11-15 is coupled to a reference input signal $Ref_{in}$. The output of each PLO 11-15 is connectable (through the switch 16) to the output of the waveform generator 10 to output the signal $Ref_{out}$. The switch 16 may be operated to sequentially or non-sequentially select the outputs of each of the PLOs 11-15. In the case of non-sequential selection, the switch 160 may be connected to, e.g., a random number generator (not shown) to control the selection of outputs of the PLO 11-15 via the switch 16.

Figure 2:
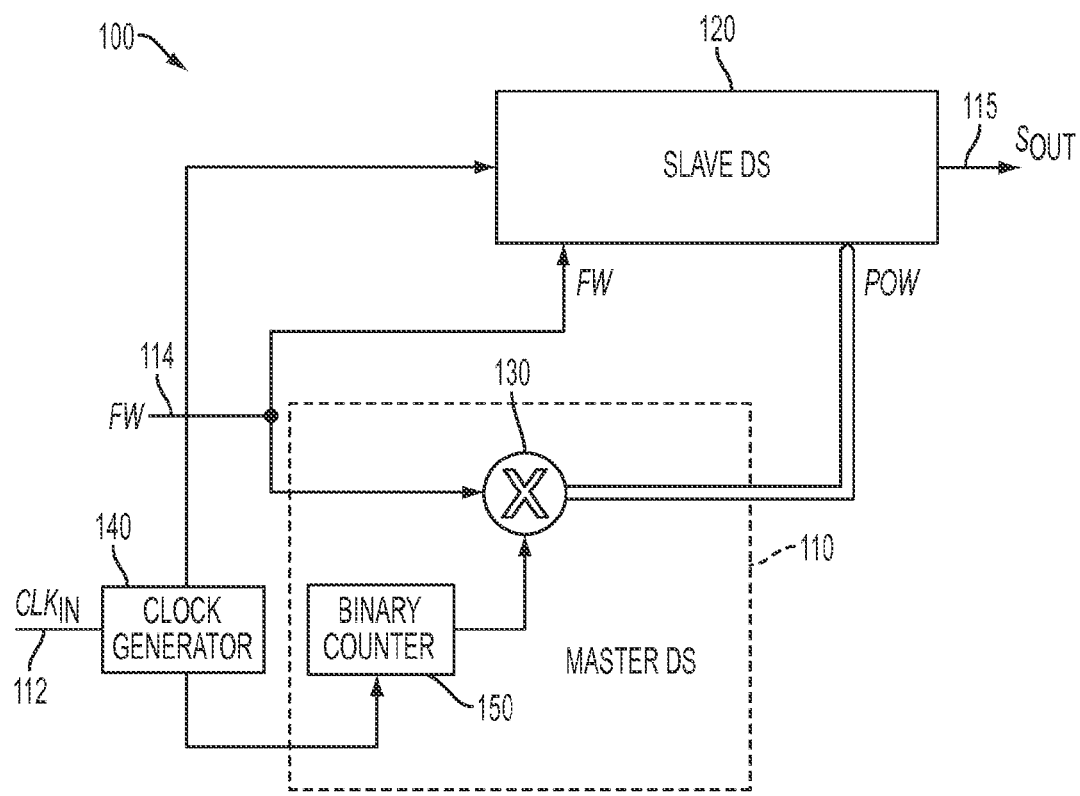
FIG. 2 shows an example of a phase coherent signal (PCS) generator, configured according to the principles of the disclosure.

FIG. 2 shows an example of a phase coherent signal (PCS) generator 100 that is configured according to the principles of the disclosure. The PCS generator 100 comprises a master digital synthesizer (DS) 110, a slave DS 120, and a clock generator 140. The master DS 110 may include a multiplying digital synthesizer (MDS). For example, the master DS 110 may include a multiplier 130 and a register (e.g., a binary counter) 150. The master DS 110 may be realized in a Field Programmable Gate Array (FPGA), Complex Programmable Logic Device (CPLD), Application Specific Integrated Circuit (ASIC), discrete logic, or the like.

The slave DS 120 may include a direct digital synthesizer (DDS). According to one embodiment of the disclosure, the slave DS 120 may include an Analog Devices AD9914—i.e., an Analog Devices 3.5 GSPS DDS with 12-bit digital to analog conversion (DAC), AD9914. The slave DS 120 may provide, e.g., eight or more phase shifts in 33.33 nanoseconds.

The PCS generator 100 may include a plurality of inputs 112, 114, and one or more outputs 115. One of the plurality of inputs (e.g., input 112) may be coupled to a clock source (not shown). Another one of the plurality of inputs (e.g., input 114) may be coupled to a frequency (tune) word generator source (not shown). The PCS generator 100 may receive a system clock frequency (or reference) signal $CLK_{in}$ from the clock source (not shown) at the input 112. The PCS generator 100 may also receive a frequency word FW (or frequency tune word FTW) from the frequency word generator (not shown) at the input 114. The PCS generator 100 may output a phase coherent signal $S_{out}$ at the output 115.

The PCS generator 100, including the master DS 110 and the slave DS 120, may be combined in a single integrated circuit (IC) using, e.g., Silicon Germanium BiCMOS, or the like.

The slave DS 120 may operate at rates that are far faster than the maximum operating rate of the master DS 110. The clock generator 140, along with the multiplier 130 and register 150 in the master DS 110, allow the master DS 110 to operate at a predetermined factor D of the system clock signal, which may be a fraction (e.g., D=⅛) of the operating speed of the slave DS 120, while disciplining the phase and operation of the slave DS 120.

For instance, the slave DS 120 may be operated at an input clock signal CLK$_{in}$ frequency of, e.g., 3.5 GHz, or more (or less), and the master DS 110 may be operated at the reduced clock signal frequency COSYN (e.g., ⅛×3.5 GHz=437.5 MHz), where D is the multiplier (or divider) implemented in the clock generator 140. The master DS 110 acts through, e.g., the phase offset word (POW) (or phase tune word (PTW)) input of the slave DS 120 to discipline the phase of the output signal S$_{out}$ output by the slave DS 120. The POW signal output by the master DS 110 may be produced by multiplying the received FW signal by the output of the binary counter 150 to supply an accumulating phase offset for the slave DS 110, allowing for coherence correction on the output signal S$_{out}$ of the slave DS 110 without any analog circuits.

In an embodiment, wherein the master DS 110 includes an MDS that comprises a multiplier 130 and an n-bit binary counter 150, the master DDS 110 is inherently phase coherent. A phase value P(i) of the master DDS 110 may be determined from the following relationships:

$$R(i)=R(i-1)+N \quad \text{[EQUATION 1]},$$

$$R(i)=N \cdot i \quad \text{[EQUATION 2]},$$

where R(i) represents a binary number corresponding to the phase value for the master DS 110, i is a natural number of the time index, and N is a binary increment word that may be added; the phase value P(i) in radians, $$P(i)=R(i) \cdot 2 \cdot \pi/2^n \quad \text{[EQUATION 3]},$$

$$P(i)=R(i) \cdot \pi/2^{n-1} \quad \text{[EQUATION 4]},$$

$$P(i)_{REF}=i \cdot \pi/2^{n-1} \quad \text{[EQUATION 5]},$$

$$P(i)=N \cdot P(i)_{REF} \quad \text{[EQUATION 6]},$$

where n is the frequency tuning word's (FTW) length, and P(i)$_{REF}$ is a reference phase signal. Equation 6 may be used to determine the operation of the master DS 110, which includes the n-bit binary counter 150 and digital multiplier 130.

When a change is to be made to the output frequency of the output signal S$_{out}$, the accumulating slave DS 110 may be cleared (e.g., all digits set to zero) and a digital number equal to P(i) (=N·i·π/2$^{n-1}$) may be presented to the POW input of the slave DS 110. The output phase of the slave DS 110 may then assume the phase of the master DS 120. FIGS. 4A-4E show a series of graphs that illustrate this process in terms of time and phase.

Figure 3:
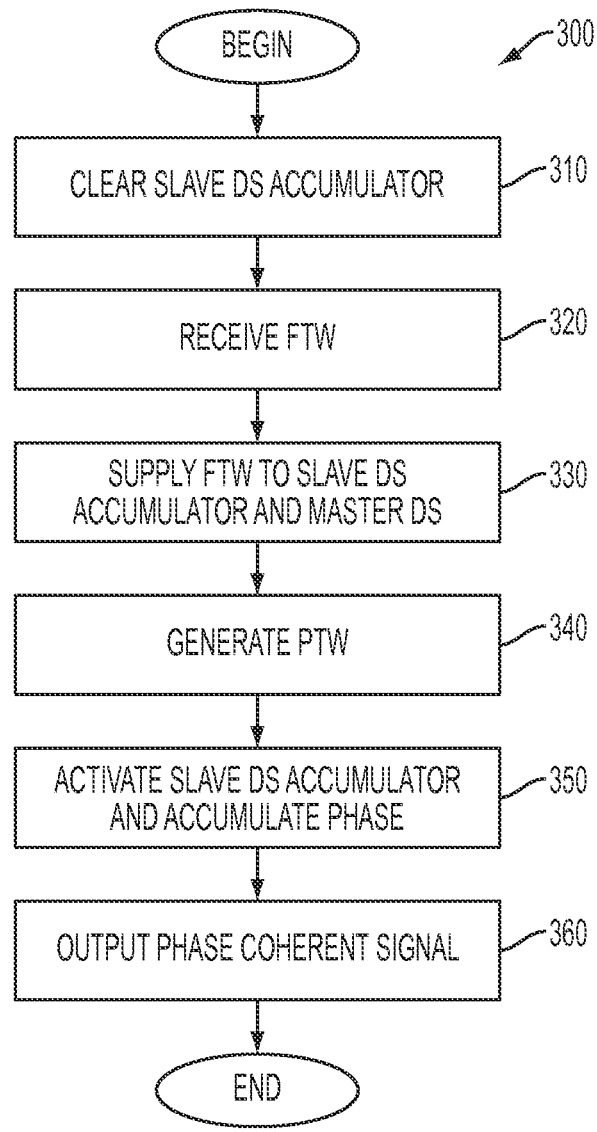
FIG. 3 shows an example of a process for generating a phase coherent signal according to the principles of the disclosure.

FIG. 3 shows an example of a process 300 for generating a phase coherent signal, according to the principles of the disclosure. Referring to FIGS. 2 and 3 concurrently, the process may begin by clearing the slave DS 120 accumulator by, e.g., setting all of the bits to logic 0 (Step 310). This may be done by supplying a Reset signal to the slave DS 120 (e.g., Reset signal shown in FIG. 5). A new frequency tune word (FTW) signal may be received from a FTW source (not shown), identifying a new frequency for the output signal S$_{out}$ (Step 320). The FTW signal may be simultaneously supplied to both the slave DS 120 and the master DS 110 (Step 330). The digital phase in the slave DS 120 may change from a phase φ1 to φ1×F2/F1, where F1 was the initial frequency and F2 is the new frequency. The phase data generated by the master DS 110 may be multiplied by a multiplier (e.g., 8) to generate a pulse tune (or offset) word (PTW) (or POW) (Step 340). The PTW (or POW) may be applied to the slave DS 120 to activate the slave DS 120 and accumulate phase at a rate determined by the clock signal CLK$_{in}$ and the PTW (Step 350). The phase of the signal output by the slave DS 120 may be set (or adjusted) by the PTW data from the master DS 110 to provide the phase coherent signal S$_{out}$ (Step 360).

FIGS. 4A-4E show time-phase diagrams that illustrate an example of the operation of the PCS generator 100 (or PCS generator 200 shown in FIG. 5), operating in accordance with the process 300.

FIG. 4A shows a simplified time-phase graph showing an example of an output of a coherent synthesizer constructed according to the principles of the disclosure. As seen in FIG. 4A, the frequency of the output signal S$_{out}$ from the slave DS 120 switches from a frequency Freq 1 (or F1) to Freq 2 (or F2) and back to F1. As seen in FIG. 4A, the slave DS 120 outputs the signal S$_{out}$ at a frequency F1(F1=dφ/dt) during a first period and a third period, but outputs the signal S$_{out}$ at frequency F2 (F2=dφ/dt) during the second, intermediary period. As also seen in the diagram, the frequency of the output signal S$_{out}$ switches from F1 (departure phase) to F2 and back to F1 (correct arrival phase) while maintaining a coherent phase. In this example, F1 may equal, e.g., 3.5 GHz and F2 may equal D·F1 (e.g., ⅛·3.5 GHz=437.5 MHz).

Figure 4B:
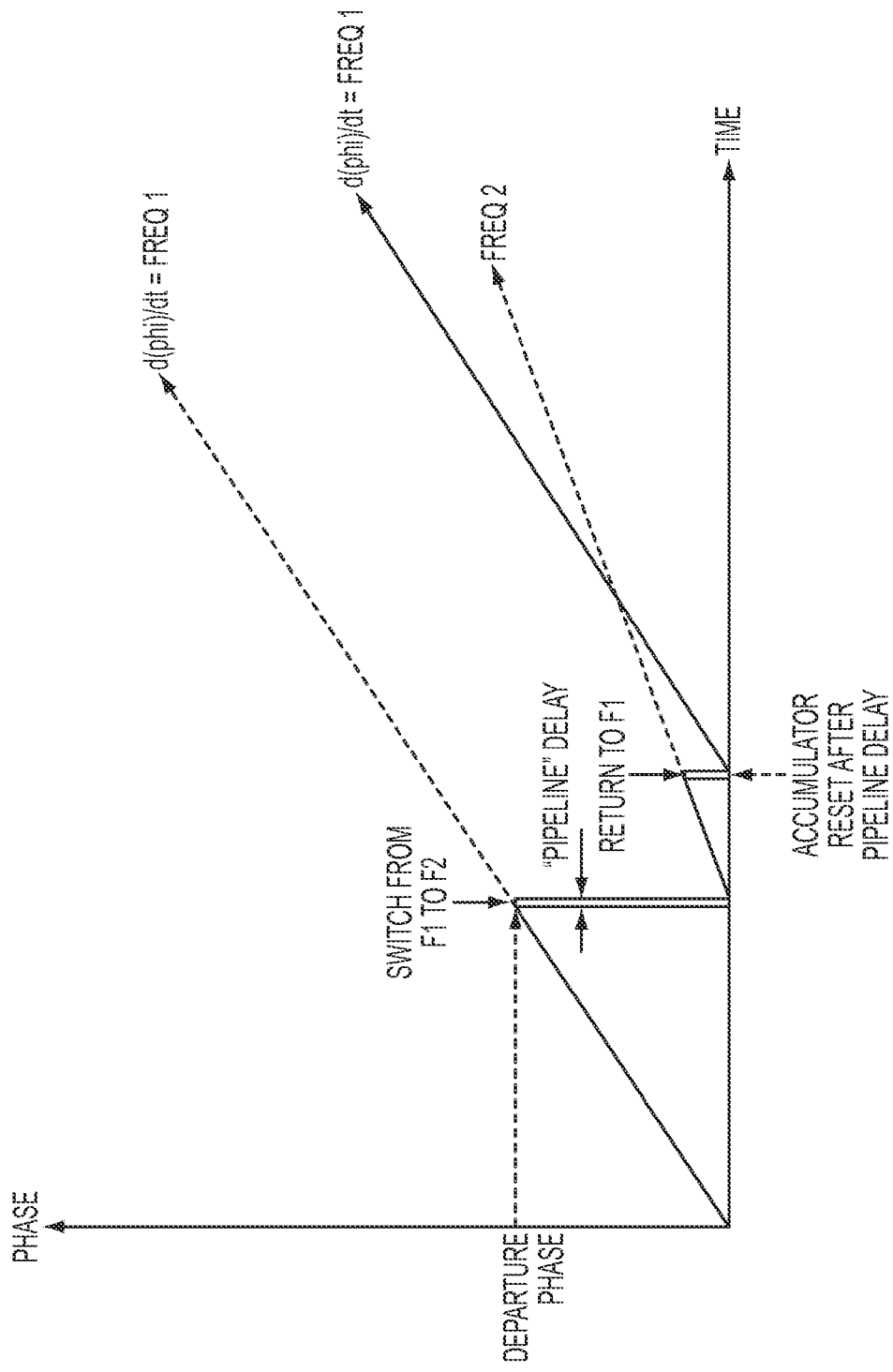
FIG. 4B shows a time-phase graph that illustrates operation of the slave DS in the PCS generator of FIG. 2.

FIG. 4B shows a time-phase graph of the slave DS 120 with the accumulator reset each time a new FTW is applied, without the disciplining influence of the master DS 110, during the same period as in FIG. 4A. As seen in the diagram, the slave DS 120 may experience a "pipeline" delay after being switched from F1 to F2 at the departure phase. The slave DS 120 may experience another pipeline delay when it is switched back from F2 to F1. The accumulator may be reset after the pipeline delay, when the slave DS 120 is switched from F2 to F1.

Figure 4C:
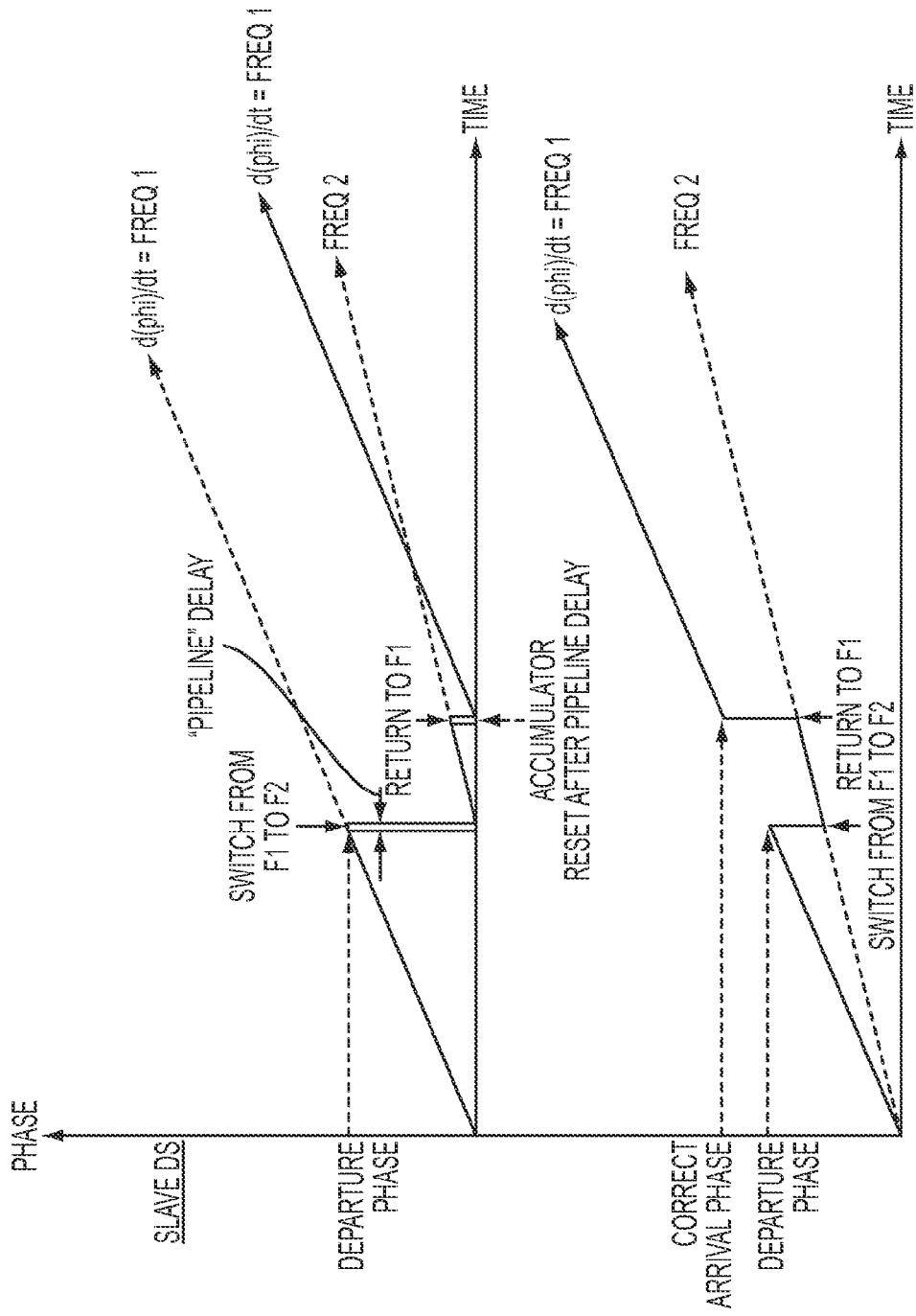
FIG. 4C shows a comparative view of the time-phase diagrams of FIGS. 4A and 4B aligned with respect to each other along a time-axis.

FIG. 4C shows a comparative view of the time-phase diagrams of FIGS. 4A and 4B aligned with respect to each other along the time-axis.

Figure 4D:
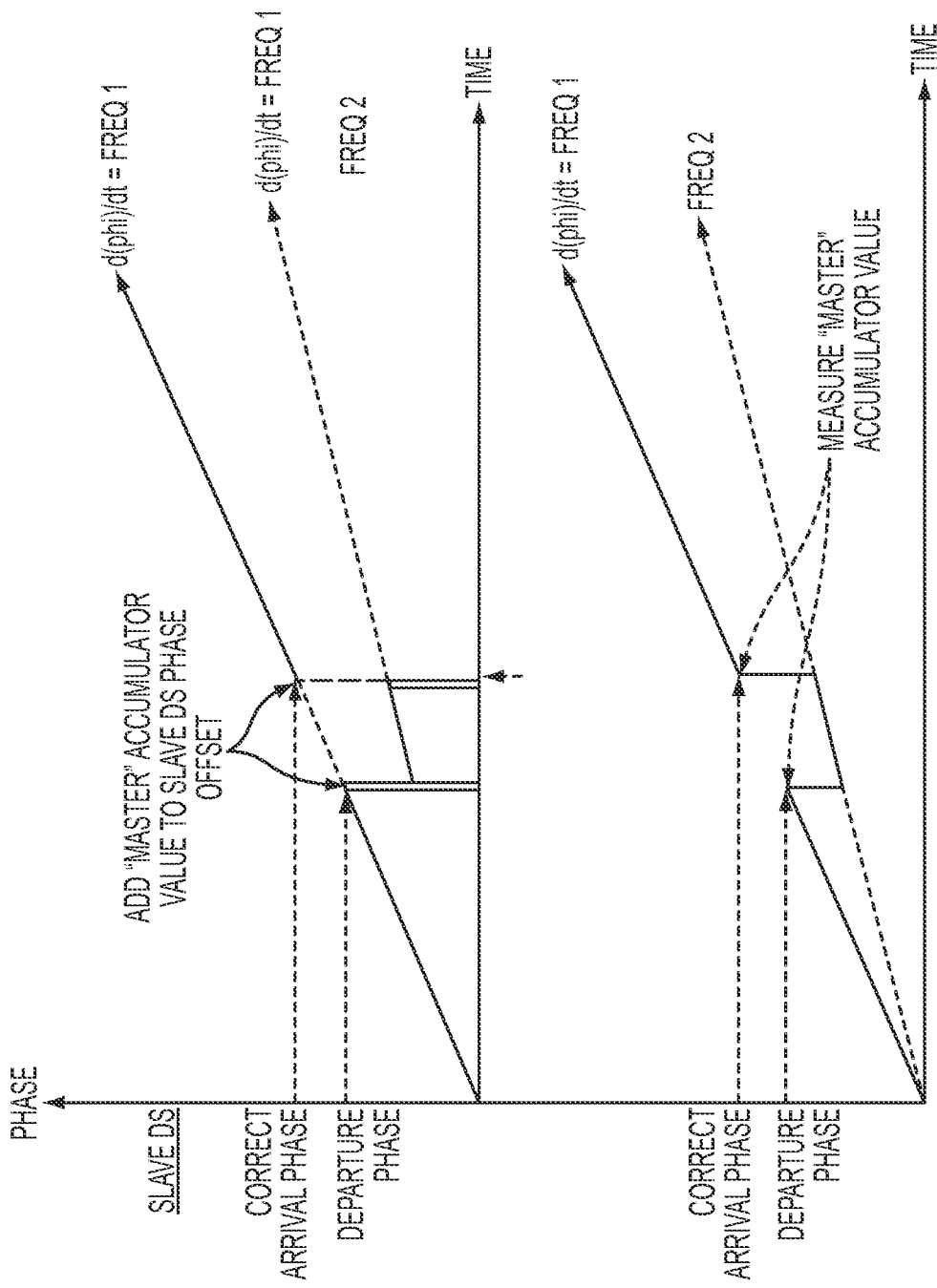
FIG. 4D shows the comparative view time-phase diagrams of FIG. 4C, including a graph that illustrates the influence of an accumulator value to a slave DS phase offset to correct an arrival phase.

FIG. 4D shows the comparative view time-phase diagrams of FIG. 4C, including a graph that illustrates the influence of the master DS 120 accumulator value to the slave DS 120 phase offset to correct the arrival phase, as seen in the upper diagram. FIG. 4D shows the effect of adding a phase tuning word from the master accumulator, thus achieving a phase coherent output signal.

Figure 4E:
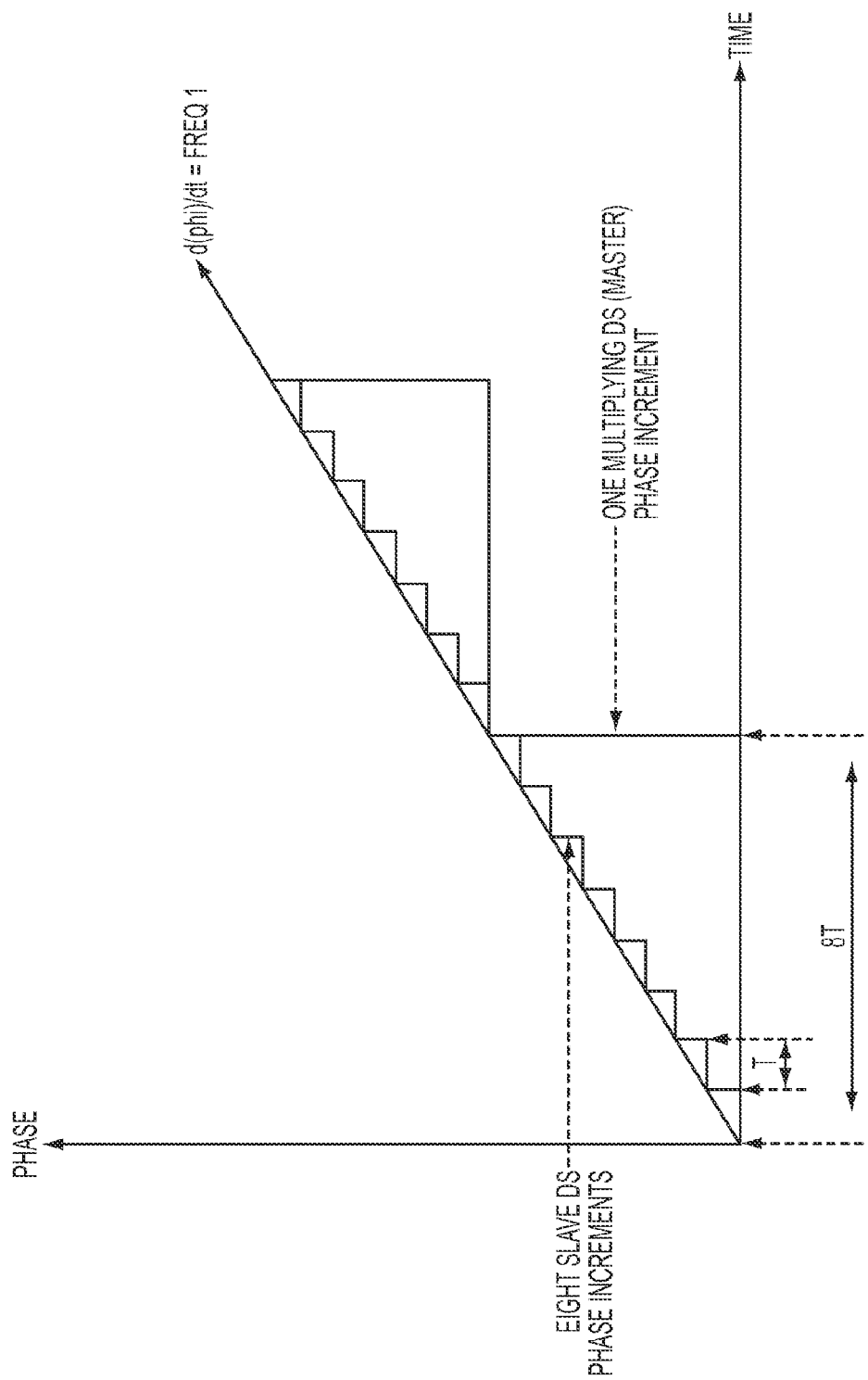
FIG. 4E shows a time-phase diagram that illustrates the disciplining of the slave DS by a master DS in the PCS generator of FIG. 2.

FIG. 4E shows a time-phase diagram that illustrates the disciplining of the slave DS 120 by the master DS 110 in 1/D steps (e.g., 8 steps) of the slave DS 120 for each increment by the master DS 120. As seen in FIG. 4E, the master DS 110 accumulator update rate may operate at an integer fraction (e.g., ⅛) of the slave DS 120 update rate.

Referring to FIGS. 2 and 4E, during operation of the PCS generator 100, the input clock signal CLK$_{in}$ (e.g., 3.5 GHz) may be applied to an input of the slave DS 120 and an input of the clock generator 140 to output the signal S$_{out}$ at a frequency F1. The clock generator 140 may be configured to multiply the clock signal CLK$_{in}$ by D (e.g., D=⅛) to output the reduced clock signal COSYN, which may then be applied to an input of the master DS 110. An FTW signal may be received from an external FTW source (not shown) and supplied simultaneously to the slave DS 120 and the multiplier 130 in the master DS 110 to generate PTW (or POW) data. The PTW data may be supplied from the master DS 110 to the slave DS 120, activating the slave DS 120 and causing the slave DS 120 accumulate phase at a rate determined by the clock rate of the binary counter 150 and the FTW signal. The POW from the master DS 110 may be applied to the slave DS 120 to set the phase of the output signal S$_{out}$ and keep it coherent as the frequency of the output signal S$_{out}$ switches from F2 back to, e.g., F1.

Figure 5:
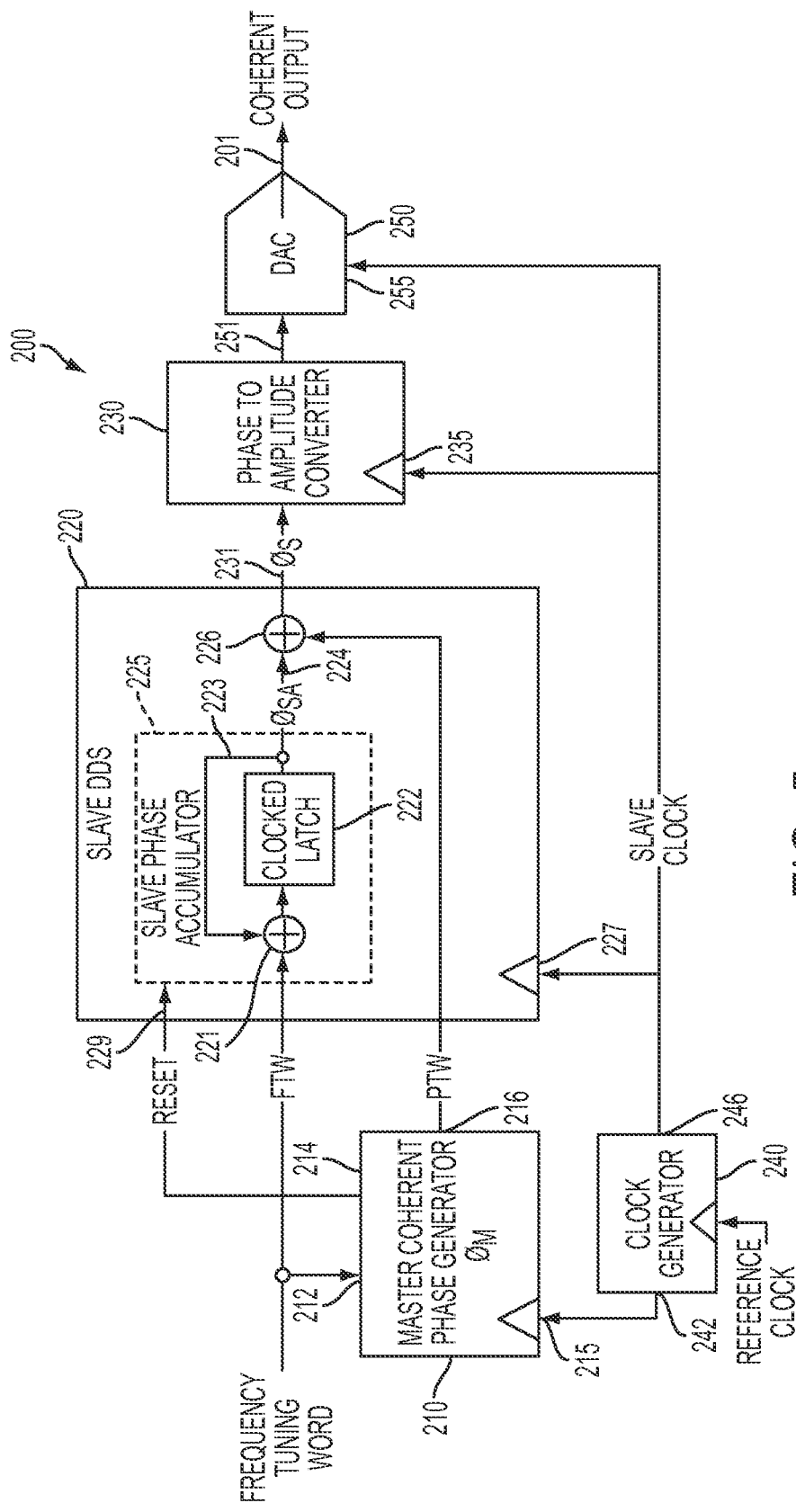
FIG. 5 shows another example of a PCS generator, configured according to the principles of the disclosure.

FIG. 5 shows another example of a PCS generator 200, configured according to the principles of the disclosure. The PCS generator 200, including its components, may be formed as a single integrated circuit (IC) using, e.g., Silicon Germanium BiCMOS, or the like. The PCS generator 200 comprises a master coherent phase generator (MCPG) 210, a slave direct digital synthesizer (DDS) 220, a phase to amplitude converter (PAC) 230, a clock generator 240, and a digital to analog converter (DAC) 250. The MCPG 210 may be realized in a Field Programmable Gate Array (FPGA), CPLD, ASIC, discrete logic, or the like. The MCPG 210 may include a clock input 215 that is coupled to a clock signal output 242 of the clock generator 240 to receive a master clock signal $CLK_{Master}$ and a frequency tuning word input 212 that is coupled to a FTW source (not shown). The MCPG 210 may also include a Reset signal output 214 and a phase tune word (PTW) (or POW) signal output 216. The slave DDS 220, PAC 230 and DAC 250 may each include a clock input 227, 235, 255, respectively, that is coupled to an output 246 of the clock generator 240, which may output a slave clock signal $N \cdot CLK_{Master}$, which is a multiple N (e.g., 8) of the master clock signal $CLK_{Master}$ that is output at the output 242 of the clock generator 240, where N is a positive non-zero integer. The clock generator 240 may be configured to receive a reference clock signal from a clock source (not shown) and output the master and slave clock signals at outputs 242, 246, respectively. The reference clock signal may be the substantially the same as the master (or slave) clock signal, or different from the master and slave clock signals.

The slave DDS 220 may include, e.g., the Analog Devices 3.5GSPS Direct Digital Synthesizer with 12-bit DAC, AD9914, or the like.

The slave DDS 220 may include a slave phase accumulator 225 and a summer 226. The phase accumulator 225 may include a summer 221, a clocked latch 222, and a feedback line 223. The slave phase accumulator 225 may further include a Reset input 229, which may be coupled to the Reset signal output 214 of the MCPG 210. The slave DDS 220 may receive a Reset signal and a phase tune word (PTW) signal from the MCPG 210, the FTW signal from the FTW source (not shown), and the slave clock signal $N \cdot CLK_{Master}$ from the clock generator 240, and output a signal 231, having a phase $\phi_S$, to an input of the PAC 230. The PAC 230 may convert the received signal 231 and output a signal 251 to an input of the DAC 250. The DAC 250 may convert the received digital coherent signal 251 and output an analog coherent output signal 201.

The MCPG 210 may comprise a binary counter (not shown) and a multiplier (not shown), similar to the binary counter 150 and multiplier 130 in the master DS 110 shown in FIG. 1.

Figure 6:
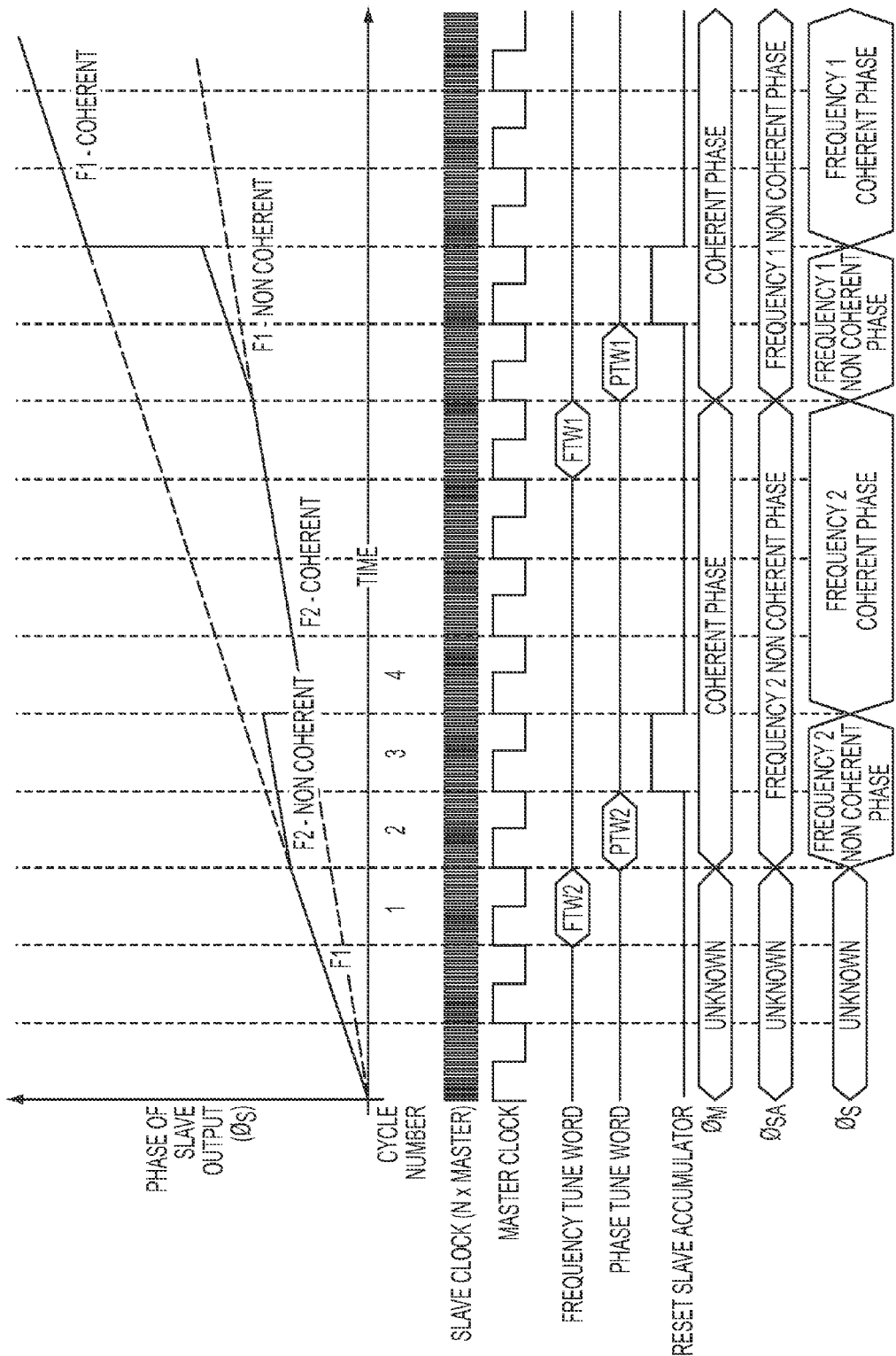
FIG. 6 shows an example of a timing diagram for the PCS generator shown in FIG. 5.

FIG. 6 shows an example of a timing diagram for the PCS 200 (shown in FIG. 5), illustrating an example of the operation of the PCS 200, according to principles of the disclosure. As seen, the timing diagram includes a time-phase diagram for the output of the slave DDS 220, a waveform diagram for the slave clock signal ($N \cdot CLK_{Master}$), a waveform diagram for the master clock signal $CLK_{Master}$, a timing diagram for the frequency tune word (FTW), a timing diagram for the phase tune word (PTW), a waveform diagram for the Reset signal, a timing diagram for an accumulator phase $\phi_M$ of the MCPG 210, a timing diagram for a slave phase accumulator phase $\phi_{SA}$ of the slave phase accumulator 225, and a timing diagram for a phase $\phi_S$ of the signal 231 output by the slave DDS 220.

Referring to FIGS. 5 and 6, the PCS 200 may be coupled to a FTW source (not shown) and a clock (not shown) to receive the FTW signal and the master clock signal $CLK_{Master}$. The PCS 200 may, based on the FTW signal and master clock signal $CLK_{Master}$, output the coherent output signal 201 to, e.g., a tracking phase lock loop (PLL), which may be used in applications, such as, e.g., RF communication, Doppler radar systems, Electromagnetic Warfare (EW) systems, jammers, navigation systems, and the like, providing a CFS waveform generator that is low cost, easy to control, capable of high switching speeds, and can generate a large number (e.g., a million, a billion, or the like) distinct frequencies.

As seen in FIG. 6, the slave DDS 220 may begin an initial operation at time t=0, phase $\phi_S=0°$, and the frequency F1. A frequency tune word signal (FTW2) for frequency F2 may be applied to the input 212 of the MCPG 210 and an input (e.g., an input of the summer 221) of the slave DDS 220 in sync with the beginning of the third clock cycle of the master clock signal $CLK_{Master}$ (Cycle Number 1, shown in FIG. 6), causing the PCS generator 200 to switch the frequency of the signal 201 output by the PCS generator 200 from a frequency of F1 to a frequency of F2. The FTW source (not shown) may be synchronized with the master clock signal $CLK_{Master}$.

The MCPG 210 may receive the FTW2 signal during the third clock cycle of the master clock (Cycle Number 1) and, at the conclusion of the third clock cycle of the master clock signal $CLK_{Master}$, the MCPG 210 may output a phase tune word signal (PTW2) for the frequency F2 to the slave DDS 220 (e.g., an input of the summer 226). At substantially the same time, the MCPG 210 may operate at phase $\phi_M$, the slave DDS 220 may switch from frequency F1 to frequency F2, and the slave DDS 220 may output the signal 231 having a frequency F2 and a non-coherent phase $\phi_S$.

In the slave DDS 220, during the third clock cycle of the master clock signal $CLK_{Master}$ (Cycle Number 1), the summer 221 may receive and sum the FTW2 signal from the FTW source (not shown) and the feedback signal 224 on the feedback line 223, outputting the resultant signal to an input of the clocked latch 222. The clocked latch 222 may receive the resultant sum signal from the summer 221, latch the signal and output the signal 224 having a phase $\phi_{SA}$ to the feedback line 223 and an input of the summer 226. At another input, the summer 226 may receive the PTW2 signal, which during Cycle Number 1 may be a null (or no signal), from the MCPG 210, summing the PTW2 signal and the signal 224 to output a signal 231 having a phase $\phi_S$ to an input of the PAC 230. During Cycle Number 1, the phases $\phi_{SA}$ and $\phi_S$ may be unknown. Similarly, the phase $\phi_M$ may be unknown.

At the beginning of the fourth clock cycle (Cycle Number 2), the FTW2 signal may have ceased and the MCPG 210 may supply the PTW2 signal to the slave DDS 220 in sync with the master clock signal $CLK_{Master}$. Substantially simultaneously, the slave DDS 220 may switch the frequency of the signal 231 from F1 to F2, the MCPG 210 may begin to accumulate coherent phase $\phi_M$, the slave phase accumulator 225 may output the signal 224 having the frequency F2 and non-coherent phase $\phi_{SA}$, and the slave DDS 220 may output the signal 231 having the frequency F2 and non-coherent phase $\phi_S$.

At the beginning of the fifth clock cycle of the master clock (Cycle Number 3), the PTW2 signal may have ceased and the MCPG 210 may substantially simultaneously with the beginning of the clock cycle output a Reset signal to the slave DDS 220. During the fifth clock cycle, the slave DDS 220 may continue to output the signal 231 at the frequency F2 and non-coherent phase $\phi_S$. The Reset signal may reset the slave DDS 220 (including the slave phase accumulator 225), so that at the beginning of the sixth clock cycle of the master clock (Cycle Number 4), an accumulator value may be added to offset the slave DDS 220 phase $\phi_S$ and begin to output a coherent phase $\phi_S$ at the frequency F2.

The PCS 200 may continue to output a coherent output signal 201, having a coherent phase at frequency F2 until an frequency tune word signal (FTW1) is received to switch the output signal 201 of the PCS 200 to the frequency F1, at which the time above-described process may be repeated, as seen in FIG. 6.

The terms "including," "comprising," and variations thereof, as used in this disclosure, mean "including, but not limited to," unless expressly specified otherwise.

The terms "a," "an," and "the," as used in this disclosure, means "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of example embodiments, those skilled in the art will recognize that the disclosure can be practiced with switchable modifications in the spirit and scope of the appended claims. These examples given above are merely illustrative and are not meant to be an exhaustive list of all possible designs, embodiments, applications or modifications of the disclosure.

What is claimed is:

1. A phase coherent signal generator apparatus that has fast frequency shifting and numerous phase memory points, outputting a coherent phase signal or a continuous phase signal that includes fast switched multiple different frequency bursts, the apparatus comprising:
    a clock generator including
        an input that receives a reference clock signal,
        an output that supplies a master clock signal, and
        an output that supplies a slave clock signal;
    an accumulating digital synthesizer that includes
        a first input that receives the slave clock signal,
        a second input that receives a digital frequency tune word signal,
        a third input that receives a phase tune word signal,
        a fourth input that receives a reset signal, and
        an output that supplies a digital coherent continuous phase signal;
    a master digital synthesizer that includes
        a first input that receives the master clock signal,
        a second input that receives the digital frequency tune word signal,
        a first output that supplies the digital phase tune word signal, and
        a second output that supplies a reset signal; and
    a converter that receives the digital coherent continuous phase signal and supplies the coherent continuous phase signal.

2. The apparatus of claim 1, wherein the accumulating digital synthesizer comprises a slave phase accumulator.

3. The apparatus of claim 2, wherein the slave phase accumulator comprises a summer and a clocked latch.

4. The apparatus of claim 2, wherein the slave phase accumulator comprises a feedback line.

5. The apparatus of claim 1, wherein the accumulating digital synthesizer comprises a summer, the summer including an input that receives the digital phase tune word.

6. The apparatus of claim 2, wherein the slave phase accumulator comprises an input that receives the reset signal.

7. The apparatus of claim 1, wherein a phase of the digital coherent continuous phase signal output by the accumulating digital synthesizer is set by the digital phase tune word signal.

8. The apparatus of claim 1, wherein the clock generator multiplies the master clock signal by a predetermined multiplying factor to produce the slave clock signal.

9. The apparatus of claim 1, wherein the accumulating digital synthesizer is activated and accumulates phase at a rate determined based on the slave clock signal and the digital frequency tune word signal.

10. A phase coherent signal generator apparatus that outputs configured to output a coherent phase signal or a continuous phase signal having bursts of different frequencies, the apparatus comprising:
    an accumulating digital synthesizer that includes a first input that receives a slave clock signal and a second input that receives a digital frequency tune word signal; and
    a master digital synthesizer that includes a first input that receives a master clock signal and a second input that receives the digital frequency tune word signal,
    wherein the master digital synthesizer accumulates phase at a rate determined by the master clock signal and the digital frequency tune word signal, and
    wherein the master digital synthesizer disciplines the accumulating digital synthesizer; and
    a clock generator that receives a reference signal and divides the slave clock signal by a predetermined division factor to produce the master clock signal.

11. The apparatus of claim 10, further comprising:
    a clock generator that receives a reference signal and multiplies the master clock signal by a predetermined multiplication factor to produce the slave clock signal.

12. A phase coherent signal generator apparatus configured to output a coherent continuous phase signal having bursts of different frequencies, the apparatus comprising:
    an accumulating digital synthesizer that includes a first input that receives a slave clock signal and a second input that receives a digital frequency tune word signal; and
    a master digital synthesizer that includes a first input that receives a master clock signal and a second input that receives the digital frequency tune word signal,
    wherein the master digital synthesizer accumulates phase at a rate determined by the master clock signal and the digital frequency tune word signal, and
    wherein the master digital synthesizer disciplines the accumulating digital synthesizer; and
    wherein the master digital synthesizer comprises:
        a binary counter having an input coupled to the clock generator; and
        a digital multiplier having an input coupled to the binary counter.

13. The apparatus of claim 12, wherein the digital multiplier comprises another input that receives the digital frequency tune word signal.

14. The apparatus of claim 12, wherein the digital multiplier comprises an output that supplies a digital phase tune word signal to the accumulating digital synthesizer.

15. The apparatus of claim 10, wherein the accumulating digital synthesizer comprises a direct digital synthesizer with a 12-bit digital to analog converter.

\* \* \* \* \*